US007012982B1

(12) United States Patent
Basch et al.

(10) Patent No.: US 7,012,982 B1
(45) Date of Patent: Mar. 14, 2006

(54) METHOD AND SYSTEM FOR DE-JITTERING OF TRANSMITTED MPEG-2 AND MPEG-4 VIDEO

(75) Inventors: Evert Basch, Stow, MA (US); Khaled Shuaib, Winchester, MA (US); Tarek Saadawi, Teaneck, NJ (US); Steven Gringeri, Foxboro, MA (US); Myung Lee, Paramus, NJ (US)

(73) Assignee: Verizon Laboratories Inc., Waltham, MA (US)

( * ) Notice: Subject to any disclaimer, the term of this patent is extended or adjusted under 35 U.S.C. 154(b) by 1065 days.

(21) Appl. No.: 09/597,112

(22) Filed: Jun. 20, 2000

Related U.S. Application Data

(60) Provisional application No. 60/167,339, filed on Nov. 24, 1999.

(51) Int. Cl.
H04L 25/00 (2006.01)
H04L 25/40 (2006.01)
(52) U.S. Cl. ........................ 375/371; 375/354; 375/357
(58) Field of Classification Search ................ 375/371, 375/354, 357; 370/395.64
See application file for complete search history.

(56) References Cited

U.S. PATENT DOCUMENTS

| | | | | |
|---|---|---|---|---|
| 5,565,924 A | * | 10/1996 | Haskell et al. | 348/423.1 |
| 5,774,497 A | * | 6/1998 | Block et al. | 375/226 |
| 5,883,924 A | * | 3/1999 | Siu et al. | 375/226 |
| 5,966,387 A | * | 10/1999 | Cloutier | 370/516 |
| 6,327,274 B1 | * | 12/2001 | Ravikanth | 370/516 |
| 6,400,129 B1 | * | 6/2002 | Yamaguchi et al. | 324/76.82 |
| 6,493,395 B1 | * | 12/2002 | Isaksson et al. | 375/261 |
| 6,621,860 B1 | * | 9/2003 | Yamaguchi et al. | 375/226 |
| 6,665,317 B1 | * | 12/2003 | Scott | 370/516 |

OTHER PUBLICATIONS

Sudhir Dixit et al., MPEG-2 over ATM for Video Dial Tone Networks: Issues and Strategies, IEEE Network, Sep./Oct. 1995, pp. 30-40.

Panagiotis N. Zarros et al., Interparticipant Synchronization in Real-Time Multimedia Conferencing Using Feedback, IEEE/ACM Transactions on Networking, vol. 4, No. 2, Apr. 1996, pp. 173-180.

(Continued)

Primary Examiner—Jayanti Patel
Assistant Examiner—Qutub Ghulamali
(74) Attorney, Agent, or Firm—Leonard C. Suchyta, Esq.; Joel Wall, Esq.; Rader, Fishman & Grauer PLLC

(57) ABSTRACT

The present invention relates to an improved method of de-jittering MPEG-2 and MPEG-4 data that is transmitted over a network. First, a network system jitter associated with periodic reference data packets is estimated. Then, the estimated system jitter is used to adjust clock-stamped reference values in the data packets before they are provided to the PLL for clock synchronization. The invented de-jittering method improves the PLL's ability to synchronize the MPEG data and provides for a better quality playback.

14 Claims, 3 Drawing Sheets

OTHER PUBLICATIONS

I.F. Akyildiz et al., Comparison and Evaluation of Packing Schemes for MPEG-2 over ATM using AAL5, Proc. of IEEE ICC Jun. 1996, pp. 1411-1415.

Leonardo Chiariglione, MPEG and Multimedia Communications, IEEE Transactions on Circuits and Systems for Video Technology, vol. 7, No. 1, Feb. 1997, pp. 5-18.

P. Venkat Rangan, Continuity and Synchronization in MPEG, IEEE Journal on Selected Areas in Communications, vol. 14, No. 1, Jan. 1996, pp. 52-60.

Changdong Liu, Multipoint Multimedia Teleconference System with Adaptive Synchronization, IEEE Journal on Selected Areas in Communications, vol. 14, No. 7, Sep. 1996, pp. 1422-1435.

* cited by examiner

MPEG DATA PACKET

METHOD AND SYSTEM FOR DE-JITTERING OF TRANSMITTED MPEG-2 AND MPEG-4 VIDEO

CROSS-REFERENCE TO RELATED APPLICATIONS

This application claims priority under 35 U.S.C. § 119 based on U.S. Provisional Application Ser. No. 60/167,339, filed Nov. 24, 1999, the disclosure of which is incorporated by reference.

STATEMENT REGARDING FEDERALLY SPONSORED RESEARCH OR DEVELOPMENT

This invention was made with Government support under Contract No. DAAL-01-96-2-0002, awarded by the U.S. Army Research Laboratory. The Government has certain rights in this invention.

FIELD OF INVENTION

This invention relates generally to the field of multimedia transmission over a network. More specifically, this invention relates to method of de-jittering MPEG-2 and MPEG-4 video data transmitted over a packet switched network.

BACKGROUND OF THE INVENTION

The MPEG-2 and MPEG-4 standards are well-known in the art for coding and storing multimedia video and associated audio information. When MPEG multimedia data is transmitted over a network from a source device to a destination device, it is important that the transmitted data be synchronized at the destination device by matching the destination device's clock to the source device's clock. It is known in the art to use a phase locked loop (PLL) at the destination device to synchronize the source device's clock with the destination device's clock.

Generally, as is known in the art, MPEG-2 and MPEG-4 standards call for multimedia data to be coded and stored in discrete data packets. The format of each data packet provides for a "clock-stamp" reference value in which a time reference value from the source device's clock can be stored prior to transmission across the network. When a stream of data packets are transmitted over a network, only a selected sample of the data packets actually include a clock-stamp time reference stored in the reserved data bytes. The destination device compares the clock-stamp time references that it receives in the to transmitted MPEG data with the instant time provided by the destination device's local clock. From this comparison, a phase error can be derived. A PLL uses the phase error to adjust the decoder clock. Methods of comparing clock-stamp time references with the destination device's clock to determine a phase error and enable a PLL to adjust the destination device's clock to match the source device's clock are known in the art.

For purposes of synchronizing the device's respective clocks, MPEG semantics assume a constant delay network between the source device and the destination device. However, it is difficult, if not impossible, to maintain a constant network delay. Non-constant network delays, known as "jitter", can result in a degradation of the video playback. Jitter results in data packets arriving at the destination device in a non-uniform manner, which impedes effective clock synchronization by the PLL. Specifically, the PLL must perform additional filtering in order to correctly estimate the STC clock values. This, in turn, slows down the responsiveness of the PLL and affects the maximum phase error introduced by the PLL between the clock-stamped reference values encoded from the source device's clock and the corresponding destination device's time clock references. To assure a stable recovery of the source device's clock values (also referred to as the system clock (STC)) by the PLL, de-jittering algorithms must be performed before the encoded clock values are passed to the PLL.

BRIEF SUMMARY OF THE INVENTION

The present invention comprises an improved method and system for reducing jitter in MPEG data transmissions due to non-constant network delay times. Generally, the present invention calculates a statistical estimation of the average network system jitter. The estimated average network system jitter is then used to re-calculate a "corrected" reference value for subsequent clock-stamp reference values. Specifically, for each data packet that contains a clock-stamp reference value, the clock-stamp reference value is parsed out from the rest of the data packet. The average network jitter is estimated based on a prior predetermined sample of data packets. An estimated jitter is then calculated for the reference data packet. The estimated reference jitter is then translated to clock tics and a "corrected" clock-stamp reference value is calculated. Finally, the original clock-stamp reference value of the subsequent reference data packet is replaced with the "corrected" clock reference value, which includes compensation for the statistical estimation of network jitter, before it is sent to a phase locked loop (PLL). Since the new clock reference values are "corrected" based upon the statistical estimation of the average network system jitter, the phase error of the PLL is minimized, resulting in a more stable system time clock (STC). Among other benefits, the present invention improves the quality of the received video and enables the system to tolerate more network jitter without video degradation.

DETAILED DESCRIPTION OF A PREFERRED EMBODIMENT

Figure 1:
FIG. 1 shows a representative MPEG data packet comprising a header portion and a payload portion.

MPEG-2 and MPEG-4 video standards provide for multimedia data to be coded and transported in data packets. As shown in FIG. 1, each MPEG-2 and MPEG-4 data packet comprises a header portion and a payload portion. As is known in the art, the header portion of the packet contains administrative information about the data packet, such as packet ID, transport priority, etc. The payload portion of the packet contains video and audio data. Depending on the format of the data packets (either MPEG-2 or MPEG-4), each header portion contains a Program Clock Reference (PCR) or Object Clock Reference (OCR), both of which correspond to the source device's clock at the time the reference data packet is transmitted. PCR or OCR data is included periodically in data packets transmitted from the source device to the destination device, and the data is used to synchronize the system clock reference (STC) at the destination device with the clock at the source device.

Figure 2:
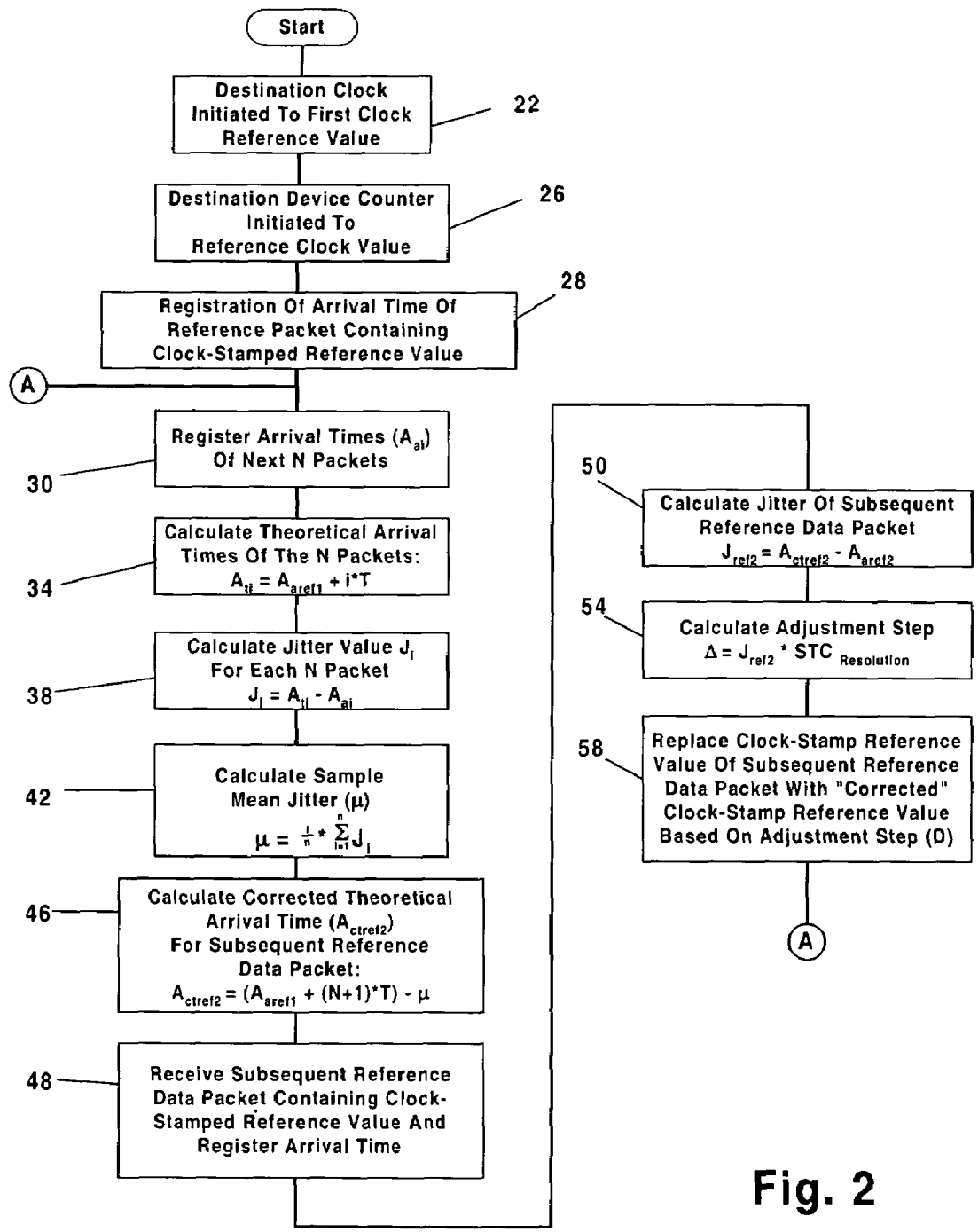
FIG. 2 is a flowchart illustrating the steps of the present invention.
Figure 3:
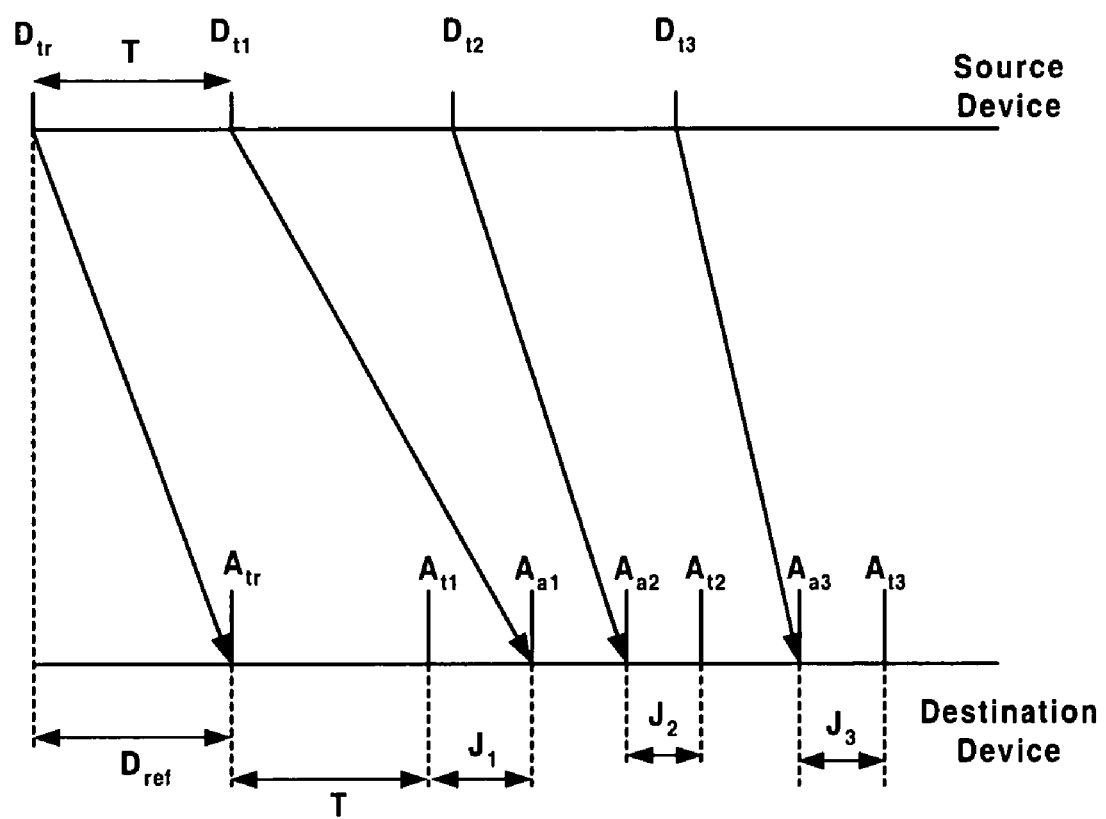
FIG. 3 comprises timing diagrams that illustrate the relative times between the transmission and receipt of MPEG data packets.

FIG. 2 shows a flow-chart that illustrates the steps of the present invention, and FIG. 3 shows a source device time line and a destination device time line that illustrates the relative timing of data packets transmitted from a source device to a destination device. The various time intervals shown in FIG. 3 assist in illustrating the steps shown in FIG. 2.

Referring to FIGS. 2 and 3, it is assumed that the source device transmits a stream of MPEG data packets with a constant nominal period T—i.e., with a constant nominal time period between each data packet transmission. The particular value of period T depends upon the application, and the present invention can be used in connection with any period T. As shown in FIG. 3, data packets are transmitted with period T from the source device at departure times ($D_t$). Arrival times $A_t$ correspond to theoretical arrival times at the destination device, assuming a constant delay network with delay time $D_{ref}$. However, because the network has a non-constant delay time, the actual arrival times differ from the theoretical arrival times. The actual arrival times are designated in FIG. 3 as $A_a$. For each data packet that arrives at the destination device, the differences between the actual arrival time $A_a$ and the theoretical arrival time $A_t$ constitutes the jitter J for that particular data packet. Each data packet that arrives at the destination device is stored in a computer memory device that is of the type that is well-known in the art.

It is assumed that a clock-stamp reference value carrying a snap shot of the value of the clock at the source device is periodically stored in the header portion of data packets and sent every $T_{ref}$ time, or every N packets. Again, the particular frequency with which reference clock values are inserted—the particular values of $T_{ref}$ and/or N—do not affect the applicability of the present invention. The value of $T_{ref}$ could be an inter-PCR or inter-OCR period, as is known in the art, depending upon the specific transport mechanism used. Each data packet that contains a clock-stamped reference value is considered a reference data packet.

In step 22 of FIG. 2, the destination device's clock is initiated to the clock-stamp reference value of the first data packet received by the destination device that includes a clock-stamp reference value. The initiation of the destination device's clock in this manner is done by default as per the MPEG standards. In step 26, a destination device counter is also initiated to the reference clock value to be used in connection with de-jittering. The destination device counter is used to register the actual arrival times of the incoming MPEG data packets.

Per step 28 of FIG. 2, the arrival time of the first reference data packet carrying a clock-stamp reference value is registered and saved. Then, as shown in step 30, the actual arrival times ($A_a$) of all subsequent packets (N) received between two successive reference data packets are registered and saved. The arrival times are stored in computer memory devices that are well-known to those skilled in the art. The actual arrival times ($A_a$) of the N packets are referred to herein as $A_{ai}$, where i=1 to N. In step 34, the theoretical arrival times ($A_t$), assuming a constant delay network, of the N packets are calculated using the actual arrival time of the reference data packet ($A_{ref1}$) as a reference point. Specifically, the theoretical arrival times ($A_{ti}$, where i=1 to N) are calculated as follows:

$$A_{ti}=A_{aref1}+i*T,$$

where $A_{aref1}$ represents the actual arrival time of the most currently-received reference data packet. As shown in step 38 of FIG. 2, a jitter value ($J_i$, where i=1 to N) is calculated for each received data packet by subtracting the actual arrival times ($A_a$) from the theoretical arrival times ($A_t$) according to the following formula:

$$J_i=A_{ti}-A_{ai}.$$

After all of the jitter values ($J_i$) have been calculated for the current subset of N data packets, a sample mean jitter ($\mu$) is calculated, as shown in step 42, according to the following formula:

$$\mu = (1/N)*\sum_{i=1}^{N} J_i$$

The calculated sample mean jitter value ($\mu$) can be positive, negative, or zero depending on the delay ($D_{ref}$) experienced by the reference data packet and the number of data packets (N) in the sample subset. The sample mean jitter ($\mu$) represents the average network system jitter over the current sample of N data packets.

Based upon the calculated sample mean jitter value ($\mu$), the jitter of the next reference data packet is estimated. Specifically, as shown in step 46, a "corrected" theoretical arrival time ($A_{ctref2}$) is calculated for the next reference data packet according to the following formula:

$$A_{ctref2}=(A_{aref1}+(N+1)*T)-\mu$$

According to the above formula, the corrected theoretical arrival time of the next reference data packet ($A_{ctref2}$) is determined by calculating the uncorrected theoretical arrival time ($A_{aref1}+(N+1)*T$) and subtracting the estimated mean network jitter ($\mu$).

The corrected theoretical arrival time of the next reference data packet ($A_{ctref2}$) is used to calculate the jitter associated with that data packet ($J_{ref2}$). After the next reference data packet containing a clock-stamped reference value is received (step 48), the jitter of that reference data packet is calculated by subtracting the actual arrival time from the corrected theoretical arrival time according to the following formula, as shown in step 50:

$$J_{ref2}=A_{ctref2}-A_{aref2}.$$

where $A_{ctref2}$ is the corrected theoretical arrival time of the next reference data packet and $A_{aref2}$ is the actual arrival time of the next reference data packet. The corrected theoretical arrival times and the jitter values of the clock-stamp reference values are determined by an electronic controller that is of the type that is well-known in the art.

The corrected theoretical arrival time of the newly-received reference data packet is then used as a reference point for the calculation of the sample mean jitter of the next N data packets. Specifically, the sample mean jitter of the next N data packets is calculated as described above, except that the corrected theoretical arrival reference time ($A_{ctref2}$) replaces the actual arrival time reference ($A_{aref1}$) described hereinabove. Since the jitter calculation of the next N packets is based on a clock-stamped reference time that incorporates compensation for an estimated average network delay, the value of $\mu$ for the following sets of N data packets should be close to zero and exhibit little variation under the same network operating conditions.

In step 54, the jitter value ($J_{ref2}$) is translated to an adjustment step ($\Delta$) in terms of the number of STC tics, according to the following formula:

$$\Delta = J_{ref2} * STC \text{ resolution,}$$

where $J_{ref2}$ is measured in seconds, and STC resolution is in tics per second. Based on the $\Delta$ value, a corrected clock-stamp reference value is calculated. As shown in step 58, the corrected clock-stamp reference value, which includes compensation for the average network delay, replaces the actual clock-stamp reference value stored in the reference data packet before it is sent to the PLL. Replacing the received clock-stamped time reference with the calculated corrected clock-stamp time reference before it is sent to the PLL minimizes the phase error of the PLL and provides a more stable STC reconstruction.

The above-described process is repeated, as shown in FIG. 2, each time a new reference data packet having a clock-stamp reference time included therein is received by the destination device. In this way, the actual clock-stamp reference value of each reference packet is replaced with a corrected clock-stamp reference value that incorporates compensation for the network system jitter. As a result, the destination device's PLL is more effective in recovering the system clock STC, which improves the quality of the video playback at the destination device.

While a preferred embodiment of the present invention has been described herein, it is apparent that the basic construction can be altered to provide other embodiments that utilize the processes and compositions of this invention. Therefore, it will be appreciated that the scope of this invention is to be defined by the claims appended hereto rather than by the specific embodiment that has been presented hereinbefore by way of example.

The invention claimed is:

1. A method of compensating for non-constant delay times of a network transmitting MPEG-2 and MPEG-4 data packets, comprising the steps of:
    estimating a network system jitter associated with reference data packets carrying clock-stamped reference values, including calculating a mean jitter value associated with arrival times of a sample of data packets;
    adjusting said clock-stamped reference values based on said estimated network system jitter;
    wherein said adjusting step comprises the substeps of calculating an estimated jitter value associated with a subsequent reference data packet based on said mean jitter value;
    adjusting said clock-stamped reference value of said subsequent reference data packet based on said estimated jitter value associated with said subsequent reference data packet;
    wherein said substeps of calculating an estimated jitter value associated with a subsequent reference data packet comprises the substep of calculating a corrected theoretical arrival time of a subsequent reference data packet based on said calculated mean jitter value;
    wherein said adjusting step further comprises the substeps of calculating an estimated jitter value associated with a subsequent reference data packet; and
    adjusting said clock-stamped reference value of said subsequent reference data packet based on said estimated jitter value associated with said subsequent reference data packet.

2. The method of claim 1, wherein said calculation of a jitter value associated with a subsequent reference data packet is based upon said corrected theoretical arrival time and an actual arrival time of said subsequent reference data packet.

3. The method of claim 2, wherein said adjusting step further comprises the substep of translating said jitter value associated with said subsequent reference data packet to a corresponding number of clock tics.

4. A method of compensating for non-constant delay times of a network transmitting MPEG-2 and MPEG-4 data packets, comprising the steps of:
    estimating a network system jitter associated with reference data packets carrying clock-stamped reference values, including calculating a mean jitter value associated with arrival times of a sample of data packets;
    adjusting said clock-stamped reference values based on said estimated network system jitter;
    wherein said adjusting step comprises the substeps of calculating an estimated jitter value associated with a subsequent reference data packet;
    adjusting said clock-stamped reference value of said subsequent reference data packet based on said estimated jitter value associated with said subsequent reference data packet; and
    wherein said substeps of calculating an estimated jitter value associated with a subsequent reference data packet comprises the substep of calculating a corrected theoretical arrival time of a subsequent reference data packet.

5. The method of claim 4, wherein said calculation of a jitter value associated with a subsequent reference data packet is based upon said corrected theoretical arrival time and an actual arrival time of said subsequent reference data packet.

6. The method of claim 5, wherein said adjusting step further comprises the substep of translating said jitter value associated with said subsequent reference data packet to a corresponding number of clock tics.

7. A method of compensating for non-constant delay times of a network transmitting MPEG-2 and MPEG-4 data packets, comprising the steps of:
    periodically receiving data packets with a nominal period;
    detecting a clock-stamp reference value in a first reference data packet;
    calculating a jitter value of each data packet received subsequent to said first reference data packet until a second reference data packet having a clock-stamp reference value is detected;
    determining a sample mean jitter from said jitter values;
    establishing a corrected theoretical arrival time for said second reference data packet;
    estimating the jitter of said second reference data packet; and
    adjusting said clock-stamp reference value of said second reference data packet.

8. An MPEG-2 and MPEG-4 transmission network, comprising:
    a source device that transmits MPEG-2 or MPEG-4 data packets with a nominal period;
    a destination device that receives said data packets; and
    an electronic communication channel having a non-constant delay period that is coupled between said source device and said destination device to receive said data packets from said source device and provide said data packets to said destination device;
    said destination device comprising an electronic controller that calculates a mean jitter value for a sample of said data packets, estimates a jitter value for a subsequent reference data packet outside of said sample, and adjusts a clock-stamp reference value of said subsequent reference data packet based on said estimated jitter value.

9. A method of compensating for non-constant delay times of a network transmitting MPEG-2 and MPEG-4 data packets, comprising the steps of:
estimating a network system jitter associated with reference data packets carrying clock-stamped reference values, including calculating a mean jitter value associated with a sample of data packets; and
adjusting said clock-stamped reference values based on said estimated network system jitter;
wherein said adjusting step comprises the substeps of calculating an estimated jitter value associated with a subsequent reference data packet based on said mean jitter value; and adjusting said clock-stamped reference value of said subsequent reference data packet based on said estimated jitter value associated with said subsequent reference data packet;
wherein said step of calculating an estimated jitter value associated with a subsequent reference data packet comprises the substep of calculating a corrected theoretical arrival time of a subsequent reference data packet based upon said calculated mean jitter value.

10. The method of claim 9, wherein said calculation of a jitter value associated with a subsequent reference data packet is based upon said corrected theoretical arrival time and an actual arrival time of said subsequent reference data packet.

11. The method of claim 10, wherein said adjusting step further comprises the substep of translating said jitter value associated with said subsequent reference data packet to a corresponding number of clock tics.

12. A method of compensating for non-constant delay times of a network transmitting MPEG-2 and MPEG-4 data packets, comprising the steps of:
estimating a network system jitter associated with reference data packets carrying clock-stamped reference values, including calculating a mean jitter value associated with a sample of data packets; and
adjusting said clock-stamped reference values based on said estimated network system jitter;
wherein said adjusting step comprises the substeps of calculating an estimated jitter value associated with a subsequent reference data packet and adjusting said clock-stamped reference value of said subsequent reference data packet based on said estimated jitter value associated with said subsequent reference data packet;
wherein said step of calculating an estimated jitter value associated with a subsequent reference data packet comprises the substep of calculating a corrected theoretical arrival time of a subsequent reference data packet.

13. The method of claim 12, wherein said calculation of a jitter value associated with a subsequent reference data packet is based upon said corrected theoretical arrival time and an actual arrival time of said subsequent reference data packet.

14. The method of claim 13, wherein said adjusting step further comprises the substep of translating said jitter value associated with said subsequent reference data packet to a corresponding number of clock tics.

* * * * *